United States Patent
Carmichael

(10) Patent No.: US 11,290,644 B2
(45) Date of Patent: Mar. 29, 2022

(54) IMAGE SYSTEM WITH 360 AND 3-D STITCHING

(71) Applicant: Christopher Carmichael, Irvine, CA (US)

(72) Inventor: Christopher Carmichael, Irvine, CA (US)

(*) Notice: Subject to any disclaimer, the term of this patent is extended or adjusted under 35 U.S.C. 154(b) by 0 days.

(21) Appl. No.: 15/939,564

(22) Filed: Mar. 29, 2018

(65) Prior Publication Data
US 2018/0376060 A1    Dec. 27, 2018

Related U.S. Application Data

(60) Provisional application No. 62/478,157, filed on Mar. 29, 2017.

(51) Int. Cl.
| | |
|---|---|
| H04N 5/232 | (2006.01) |
| H04N 13/111 | (2018.01) |
| H04N 13/246 | (2018.01) |
| H04N 13/189 | (2018.01) |
| H04N 13/221 | (2018.01) |
| H04N 13/275 | (2018.01) |
| H04N 13/261 | (2018.01) |

(52) U.S. Cl.
CPC ....... *H04N 5/23238* (2013.01); *H04N 13/111* (2018.05); *H04N 13/189* (2018.05); *H04N 13/221* (2018.05); *H04N 13/246* (2018.05); *H04N 13/261* (2018.05); *H04N 13/275* (2018.05)

(58) Field of Classification Search
CPC ............. H04N 5/23238; H04N 13/189; H04N 13/111; H04N 13/246
See application file for complete search history.

(56) References Cited

U.S. PATENT DOCUMENTS

| | | | |
|---|---|---|---|
| 2013/0242039 A1* | 9/2013 | Cha ..................... | H04N 5/23238 348/36 |
| 2017/0064289 A1* | 3/2017 | Lo ......................... | H04N 13/221 |
| 2018/0103284 A1* | 4/2018 | Kubo ............... | H04N 21/25875 |

OTHER PUBLICATIONS

Muhammad (Panorama View With Spatiotemporal Occlusion Compensation for 3D Video Coding—IEEE Transactions on Image Processing, vol. 24, No. 1, Jan. 2015) (Year: 2015).*

* cited by examiner

*Primary Examiner* — Nasim N Nirjhar
(74) *Attorney, Agent, or Firm* — Law Office of Scott C Harris, Inc

(57) ABSTRACT

A 360° view of an area is obtained by stitching together multiple images each of the images obtained at a different point of view. One of the points of view or each one of the points of view receives different angled views of different features in the image. Each feature in the image is therefore imaged from multiple different angles. The images are stitched together into a three-dimensional panorama which is optimized for display on a display where one image is intended for users left eye and another image is intended for the users right eye. The left eye sees features of the image from one field of view, and the right eye sees features of that same image from a different field of view, where each field in the image is shown to the different eyes at different points of view. Therefore, the different eyes perceive different parts of the depth of the image. And that last part into the specification and maybe into the claims.

7 Claims, 1 Drawing Sheet

IMAGE SYSTEM WITH 360 AND 3-D STITCHING

This application claims priority from provisional application No. 62/478,157, filed Mar. 29, 2017; the entire contents of which are herewith incorporated by reference.

BACKGROUND

Conventional cameras take a two dimensional image, as either a single image or series of images over time which can be seen as a video. The camera has a field of view. Image stitching can be used to expand that field of view by stitching together different parts of different fields of view to form a wider field of view.

SUMMARY

The present application describes using a single dimension camera to obtain a 360° simulated 3-D view by stitching together multiple images taken in a 360° array.

BRIEF DESCRIPTION OF THE DRAWINGS

The drawings show aspects of the invention, where.

DETAILED DESCRIPTION

The present application is described from the point of view of taking a single image with a single dimensional camera such as a camera in a cellular phone. The single image is taken at different angles over time, e.g. in a panorama. The panorama is taken over 360° by twirling around a fixed center point while the camera is recording.

Figure 1:
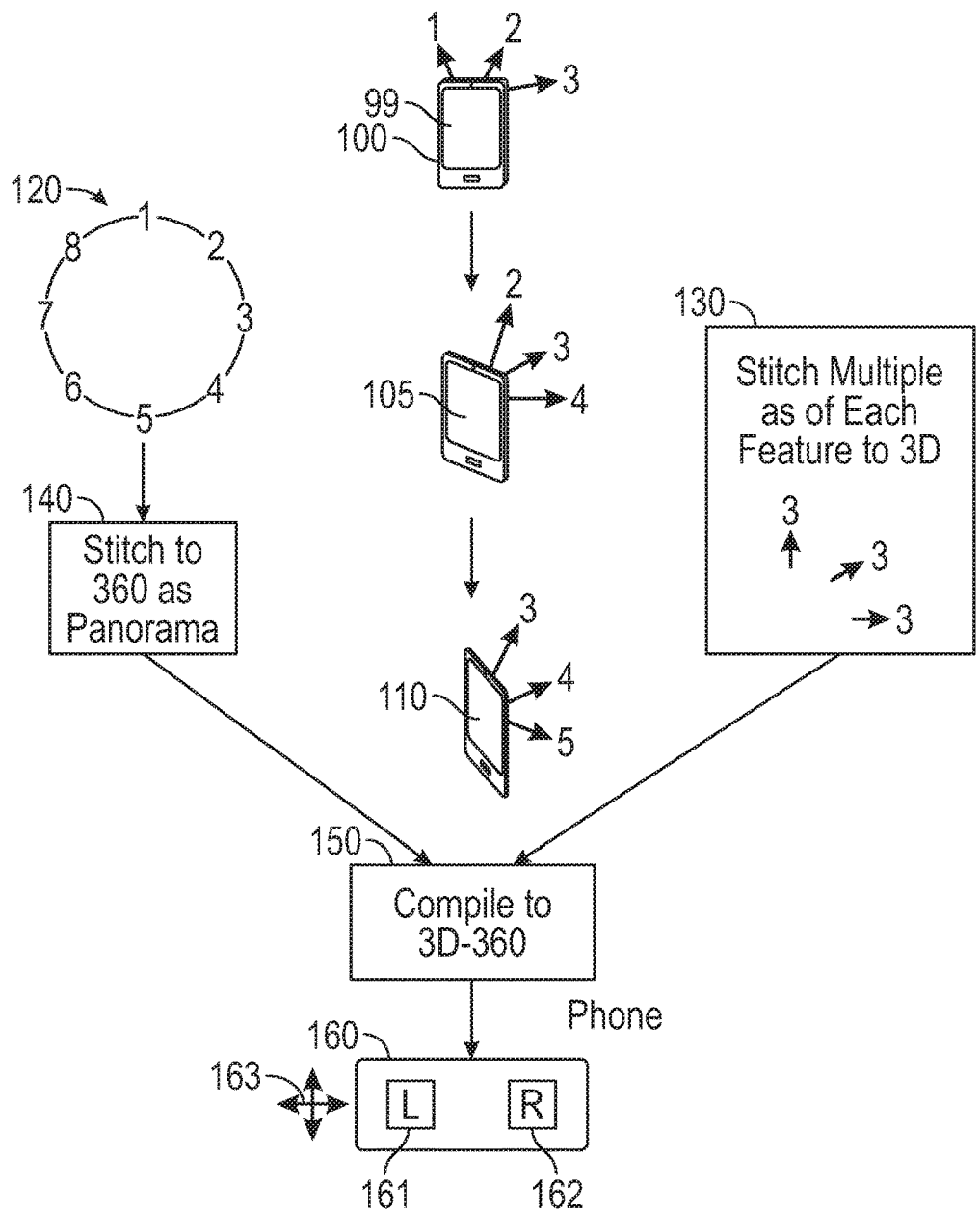
FIG. 1 shows a flowchart of operation of the system to stitch together images into a combined image.

FIG. 1 illustrates the operation: where a cellular phone 99 is shown facing at a first time in a first direction 100 obtaining images of the vantage points 1, 2 and 3. The cellular phone is then moved in an angle over time, e.g. continually in a 360° arc.

At a second time, the phone has been tilted at an angle 105, such that it is obtaining an image whose vantage points extend over the points 2, 3 and 4. As the phone continues to circumscribe the 360° arc, the phone when pointed in the direction 110 obtains an image over the vantage points 3, 4, 5.

120 shows how the phone continues around in the 360° arc, to obtain images of vantage points 1, 2, 3, 4, 5, 6, 7, 8. This assumes an example where there are only 8 points captured around the circle, when in fact there can be many more than 8 points, e.g, 16, 32, or even hundreds or thousands of points. However, from the point of view of explaining this operation, the operation can be simplified to 8 points.

For each point, such as point 3, there will always be multiple viewpoints taken at different fields of view. For example, the point 3 is imaged from the far left when the camera is at position 100, from the center when the camera is at position 105, and from the left when the camera is at position 110. Element 130 shows how the different views get different information about the point 3 from different angular perspectives.

Of course, in reality as the phone circumscribes the 360° arc, there are many more different images/vantage points taken of each area. 130 illustrates how each of these multiple angles, representing the view of the vantage point from one of those different points of view, is stitched to 3-D.

140 illustrates how the entire 360° image is stitched into a panorama. By obtaining both three-dimensional information from the multiple angles, and stitching information from the multiple positions, the system compiles together a 3-D–360° image of the surroundings.

The phone includes, as conventional, a processor and memory, which processes all this information to create a simulated three dimensional scene shown in 160 having a left image 161 and a right image 162. This is shown on the screen of the cellular phone. The cellular phone is then used along with virtual-reality head gear 160. The virtual-reality headgear on the phone senses the position of the phone using the phone's gyroscope shown as 163. For each position of the phone, a different position corresponding to where the user is looking, will be shown on the left and right images, and thus shown to the wearer of the virtual-reality headset.

Figure 2:
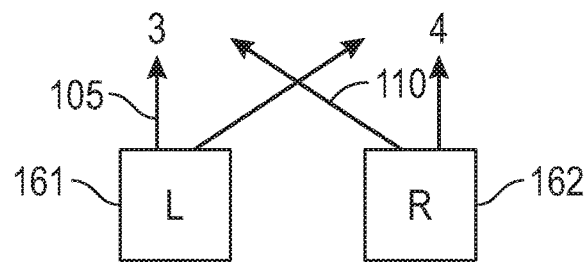
FIG. 2 illustrates how the left and right eyes are given different kinds of information.

The content of the images which are compiled at 150 depends on the direction of receiving the images, as illustrated in FIG. 2. In FIG. 2, the left and right eyes both see different points of view of the images, simplified herein as being only items number 3 and 4 from the different viewpoints shown in FIG. 1. The left eye view 161 receives the item 3 as the full on view of the item 3, obtained as the center image from the point of view position of 105 in FIG. 1. Therefore, the left eye receives the center on image of position 3 from the point of view 105. The right eye is also viewing item 3, however is viewing it from the left to right position, illustrated for example in FIG. 1 as position 3 being viewed from the left from point of view 110 in FIG. 1. Therefore, the left eye 161 is receiving the view of item 3 from point of view 105. The right eye display 162 is receiving the view of item 3 from the left, the point of view item 110. Similarly, the left eye is receiving the point of view of item 4 from as viewed from the right, while the right eye is receiving a view of item 4 as viewed straight on. In this way, both the left and right eyes displays receive different information, the different information obtained from the different positions of stitching during the compilation to 3-D.

The left eye sees features of the image from one field of view, and the right eye sees features of that same image from a different field of view, where each field in the image is shown to the different eyes at different points of view. Therefore, the different eyes perceive different parts of the depth of the image. For example, if the system is you imaging a user's face, element 130 may image the left side of the user's face with the first view from point of view 100, the center on view of the face from the second view 105, and the right side of the face with the third view from 110. When the user looks at the face through the compiled 360° image over the device 160, the user sees different points of view of the image of the face through their different eyes.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example while the above describes only certain kinds of user interface devices, it should be understood that other kinds of devices may similarly be used. Also, this refers to images, but it should be understood that this can similarly be applied to videos, and the information about the images referring only to one specific moment in the image.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

Any kind of processor or client can be used with this invention.

What is claimed is:

1. A method of compiling information for a three dimensional, 360 degree view for a virtual-reality device, comprising:

using a camera to obtain a 360 degree view of an area, by rotating the camera around the 360 degree view, to obtain information about features in the view over each of a plurality of different points of view as the camera is rotated, the plurality of different points of view including at least from a left side point of view, a middle point of view, and a right side point of view of the features in the image;

stitching together multiple points of view for each feature in the image obtained from moving the camera through the multiple different points of view to form stitched features;

stitching together the 360° view of the area as a 360° panorama;

compiling together said multiple points of view in each feature along with the 360° panorama, to form a 3 dimensional 360° view from both the stitched features and the 360° panorama; and based on said compiling, providing first information to the left eye view indicative of a first feature in the image from a middle point of view and of a second feature in the image from a right side point of view, and providing second information to the right eye view indicative of the first feature in the image from a left side point of view and of the second feature in the image from the middle point of view, where the first and second information are based on the 3 dimensional 360° view.

2. The method as in claim 1, wherein said using a camera comprises obtaining information about the area over the 360° view from a camera, and further comprising stitching said information into a composite image which is compiled both for a left eye and for a right eye, where the left eye receives different information than is received for the right eye.

3. A system for compiling perspective information indicative of a three dimensional, 360 degree view, comprising:

a computer, receiving information about multiple scenes in an image from a camera that is obtaining a 360 degree view of an area, by rotating the camera around the 360 degree view, to obtain information about features in the view over each of a plurality of different point of views as the camera is rotated, the plurality of points of view of the image including at least all of from a left side point of view, a middle point of view, and a right side point of view of the features in the image;

said computer: 1) stitching together multiple points of view for each feature in the image obtained from moving the camera through the multiple different points of view to form stitched features;

2) stitching together the 360° view of the area as a 360° panorama;

3) compiling together said multiple points of view in each feature along with the 360° panorama, to form a 3 dimensional 360° view from both the stitched features and the 360° panorama;

a VR display, receiving the compiled information and displaying the compiled information with different information to different eyes;

where said compiled information displayed to the different eyes includes first information to a left eye side point of view indicative of a first spot in the image from a middle point of view and a second spot in the image from a right eye side point of view, and second information to the right eye indicative of the first spot in the image from a left side point of view and the second spot in the image from the middle point of view, where the first and second information are based on the three dimensional 360° view.

4. The system as in claim 3, further comprising the camera obtaining information about a scene over a 360° field of view, and said computer stitching said information into a composite image which is compiled both for a left eye and for a right eye, where the left eye receives different information than is received for the right eye.

5. The system as in claim 4, wherein said camera is moved around in a 360° panorama.

6. The method as in claim 1, wherein the left eye view and the right eye view are simultaneously displayed on a screen of a cellular telephone.

7. The system as in claim 3, wherein the left eye view and the right eye view are simultaneously displayed on a screen of a cellular telephone.

* * * * *